United States Patent [19]

Collister

[11] Patent Number: 5,507,611
[45] Date of Patent: Apr. 16, 1996

[54] KEY BOLT FASTENER

[76] Inventor: Frank C. Collister, 3641 Appell Dr., Port Clinton, Ohio 43452

[21] Appl. No.: 377,193

[22] Filed: Jan. 24, 1995

[51] Int. Cl.[6] .................................................. F16B 21/00
[52] U.S. Cl. .......................................... 411/345; 411/340
[58] Field of Search .................................. 411/340, 342, 411/344, 345, 351

[56] References Cited

U.S. PATENT DOCUMENTS 581,693   5/1897   Capen ..................................... 411/340

FOREIGN PATENT DOCUMENTS 10927    9/1880   Austria ................................... 411/340
274544   5/1971   U.S.S.R. ................................. 411/351

Primary Examiner—Flemming Saether
Attorney, Agent, or Firm—Oldham Oldham, Co.

[57] ABSTRACT

A key bolt fastener has a shank with a locking key-receiving adaptation at one end. The locking key is shaped like a tweezers, having a first end that joins two arms in a resilient fashion, and a bifurcate second end in which the ends of the two arms are normally in spaced apart relationship. When the locking key is retained to the key-receiving adaptation by a pin transversely disposed in the shank and passing through slots in the arms at substantially right angles, the locking key is slidable within the adaptation to an unlocked position where the first end of the locking key extends directly outwardly of the shank and forms an extension thereof. The locking key is also slidable to a locked position wherein the locking key is substantially perpendicular to the shank and a key lock abuts the bolt shank to retain the locking key in locked position. The locking key is yieldable at the bifurcate second end to enable the key lock abutment to be moved from locked position to unlocked position. In one embodiment, the key-receiving adaptation is a bolt slot; in a second embodiment, the key-receiving adaptation is a shelf-type recess.

6 Claims, 2 Drawing Sheets

KEY BOLT FASTENER

The present invention relates to key bolts. More particularly, it relates to such bolts having a locking key therein. Even more particularly, it relates to such a locking key useful even in bolts of a relatively small diameter.

BACKGROUND OF THE ART

When key bolts are used, it is highly essential that the pins be securely locked against accidental or inadvertent removal or displacement, but also be readily removable when desired. Some prior pins fail to provide a positive, infallible locking means for releasably retaining the pin in such locked position, particularly with bolts of one-half inch diameter or less.

The present inventor has four prior patents relating to this field of art. In U.S. Pat. No. 3,476,007, issued 4 Nov. 1969, a key bolt is taught that has a bolt slot at one end of the shank portion of the bolt. A generally planar key fits into the bolt slot and a pin retains the key in the bolt slot by passing through a key slot in the key. In an unlocked position, the key extends directly outwardly from the shank and forms an extension thereof. The key slides and rotates within the bolt slot to a looked position where the key is substantially perpendicular to the shank. In the preferred form of that invention, the key has a portion of one of its side walls severed or partially severed so that the severed portion can have its free end offset from and protruding out of the plane of the key. The abutment of this severed portion against the bolt shank helps to retain the key in the looked position, and the severed portion can be moved to a position within the plane of the key sufficiently that the key is movable within the bolt slot.

U.S. Pat. No. 3,673,910, issued 4 Jul. 1972, is a continuation-in-part of the present inventor's '007 patent. In the preferred embodiment of this patent, the bolt slot of the '007 patent is replaced by a shelf-type recess wherein the key is slidably received atop the shelf-type recess. The key is held atop the recess by a pin. The key used in this variation has essentially the same type of bent offset severed portion of one of the side walls as is taught in the '007 patent.

U.S. Pat. No. 3,861,267, issued 21 Jan. 1975, is a division of the application which became the present inventor's '910 patent. The key taught in this patent has its locking feature provided by having one side wall have a portion of its outer edge formed into a downwardly turned flange that extends outside of the plane of the key, which is otherwise generally planar. To urge the key against the recess and into the locking position, a resilient means is positioned between the free end of the pin and the key.

U.S. Pat. No. 4,207,794, which issued 17 Jun. 1980, teaches a key bolt in which the key is slidably movable within a transverse aperture in the shank. Unlike the earlier three patents, this key does not rotate when moving from the locked to the unlocked position. Instead, the key has an unlocked position in which it is fully retracted inside the shank and a locked position in which it is extended perpendicularly outward from the shank. A resilient portion and a positive abutment means on the key prevent inadvertent retraction of the key into the aperture.

These key bolts are useful and effective, but practical experience of the inventor has taught him that practical limitations arise when the bolt shank goes below a certain minimum diameter. Typically this is observed at a diameter around one-half inch, although the key bolt of the type taught in the '794 patent becomes troublesome at even larger diameters, around one inch.

SUMMARY OF THE INVENTION

Therefore, it is an object of the present invention to provide a novel locking key for a key bolt that unfailingly retains the pin in locked position and is capable of being used in a key bolt with a smaller diameter shank, where the key slot must be kept narrow to maintain enough shank material on either side of the key slot to provide the shank with sufficient strength.

This object is achieved by a key bolt comprising a locking key and a bolt having a shank with a locking key-receiving adaptation at one end thereof. The locking key comprises a tweezers-like complex lever having first and second generally planar elongate members. One end of each member is joined to one end of the other member to form a first end of the locking key. This end acts as a resilient fulcrum of the lever. The other end of each member extends away from the first end, such that these other ends collectively form a bifurcate second end with the members in normally spaced apart relationship. Each of the members has a slot formed along the length thereof for receiving a retaining pin. One member has its edges at the bifurcate second end turned outwardly from the plane thereof to form a key lock.

The locking key is slidably retained to the key-receiving adaptation by a pin transversely disposed in the shank and passing through the slots at substantially right angles thereto. The locking key is slidable within the adaptation to an unlocked position in which the first end of the locking key extends directly outwardly of the shank and forms an extension thereof. The locking key is also slidable to a locked position where the locking key is substantially perpendicular to the shank and the key lock abuts the bolt shank to retain the locking key in locked position. The locking key is yieldable at the bifurcate second end to enable the key lock abutment to be moved from locked position to unlocked position.

BRIEF DESCRIPTION OF THE DRAWINGS

Other objects and advantages of the invention will be apparent from the following description taken in conjunction with the drawings wherein.

DETAILED DESCRIPTION OF THE DRAWINGS

Figure 1:
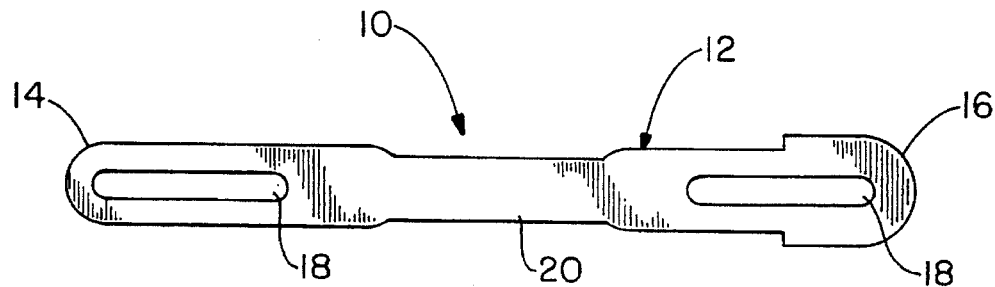
FIG. 1 is a top plan view of a blank from which the novel locking key of the present invention may be formed.
Figure 2:
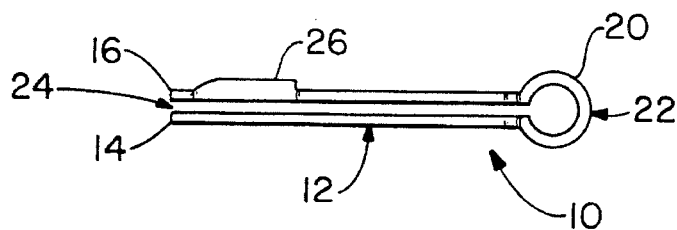
FIG. 2 is a side view of the formed locking key of the present invention.

Since the difference of the present invention from the inventor's own prior art, as well as the inventions of others, lies in the locking key 10, reference is first made to FIGS. 1 and 2, where the details of the locking key are shown.

FIG. 1 shows the locking key 10 in an unassembled state as a blank 12. The blank 12 is preferably die cut or otherwise formed from a spring grade metal, especially a spring grade steel. Persons of skill in this art will be able to select a spring grade metal having the requisite strength and yet a narrow enough thickness to allow the locking key to open within the narrow confines of the slot of a small diameter key bolt. The blank 12 is cut so that it forms a elongate member, preferably with rounded first and seconds ends 14, 16 and an elongate slot 18 centrally disposed near each end of the blank. The central portion 20 of the blank 12 may be somewhat narrower in width, as shown in FIG. 1, although this narrowing is not essential to the invention. In the preferred embodiment, the blank 12 has a length from first end 14 to second end 16 that will range from about 6 to about 14 times the most typical width from side to side, with a preferred length to width ratio being about 10.0:1.0. The length of the key to be formed must be sufficient to allow the key to form a positive lock and provide enough grasping surface for easy locking and unlocking, but the width of the key must be no larger than the diameter of the shank with which it is used. The second end 16 is slightly wider, as shown in FIG. 1, this additional width being sufficiently large to form a positive lock when bent to protrude out of the plane of the key, while still allowing the key to move freely when compressed.

As shown in side view in FIG. 2, the central portion 20 of the blank 12 has been rolled around a mandrel or other device, so that the central portion forms one end 22 of the key and the first and second ends 14, 16 of the blank lie atop each other to form a bifurcate second end 24 of the key. In this rolled shape, the slots 18 on each end of the blank are aligned to provide a single slot for receiving a pin therethrough. In rolling the blank around the mandrel to form the end 22, the blank is shaped so that the ends 14, 16 forming the bifurcated second end 24 are normally spaced apart by a gap to permit the bifurcate second end to be compressed. Due to the resilient nature of the blank, the first and second ends 14, 16 of the blank may be compressed together by manual pressure. Upon release of the pressure, the ends 14, 16 again separate to their normal gap. In this way, the locking key 10 may be likened to a complex lever of the same type as a pair of tweezers, the end 22 acting as the fulcrum and the legs 14, 16 of the bifurcated second end 24 acting as the arms of the tweezers, being compressible toward each other, but resiliently restoring upon release of the compressive force.

While specific description has been provided above on one way to produce the novel locking key 10 of the present invention, it should be understood that other manufacturing means are available to produce an equivalent to the locking key described. For example, two separate generally planar members, preferably of spring metal, could be joined by brazing or welding at one end of each to form the resilient fulcrum end 22.

Figure 3:
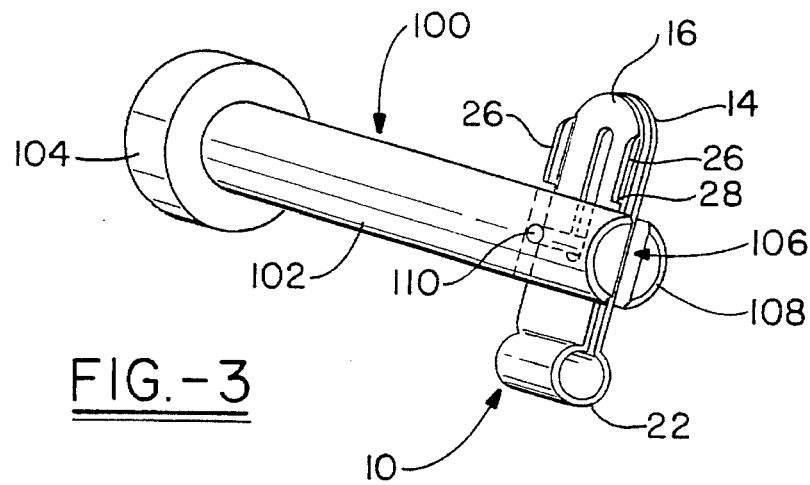
FIG. 3 is a perspective view of a first type of key bolt employing the novel locking key of the present invention, with the locking key in the locked position.
Figure 4:
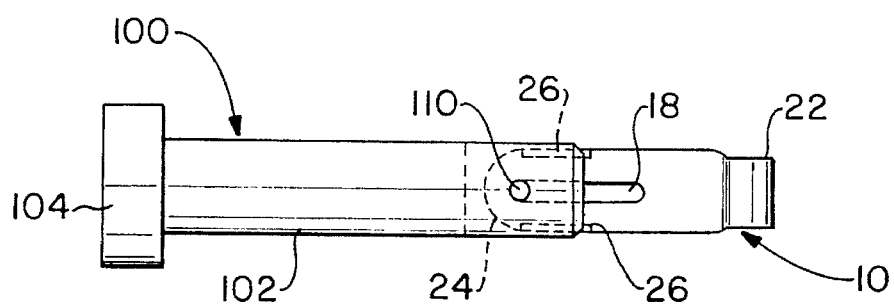
FIG. 4 is a side view of the first type of key bolt employing the novel locking key of the present invention, with the locking key in the unlocked position.

Referring now to FIG. 3, there is shown a key bolt 100, which is constructed in accordance with the invention. The key bolt 100 includes a shank 102 having a bolt head 104 at one end thereof. The shank 102 has an open, transversely disposed bolt slot 106 at its other end to form a bifurcated end 108 thereat. The locking key 10 as described above is slidably disposed in the bolt slot 106 and is shown having its ends 22, 24 extending transversely from the shank 102. A pin 110 is transversely disposed in the shank 102 at its bifurcated end 108 and passes through the bolt slot 106 and the slots 18 in the locking key 10 at substantially right angles thereto to slidably retain the key 10 within the bolt slot. The key 10 is slidable in the bolt slot 106 to an unlocked position wherein the key extends directly outwardly of the shank and forms an extension thereof as shown in FIG. 4. In this position the bolt 100 may be inserted or removed from an aperture having a diameter slightly larger than the shank 102. Note particularly that the rolled end 22 of the key 10 is always positioned outside of bolt slot 106, since it is larger than the bolt slot, but that the bifurcated end 24 of the key can be fitted into the bolt slot by manually compressing the key at that end and releasing the compressive force once the end is in the bolt slot. As noted above, when the key 10 is in the locked position as in FIG. 3, the key is substantially perpendicular to the shank 102.

The second end 16 of the blank has a slightly greater width, allowing the sides to be turned upwardly to form wings 26. These wings 26 protrude out of the general plane of the key 10 to form an abutment or key lock 28 abutting the bolt shank 102 adjacent its bifurcated end 108 to retain the key 10 in locked position.

Figure 5:
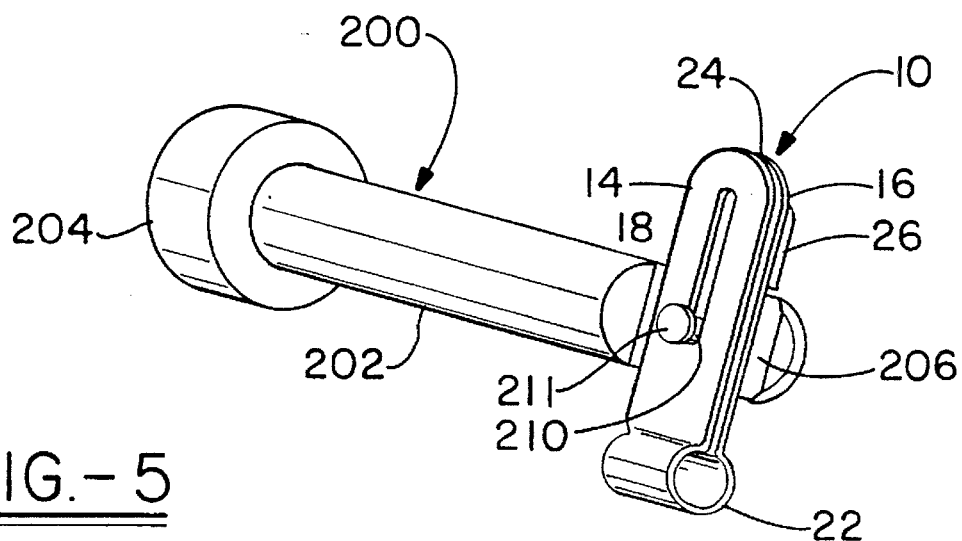
FIG. 5 is a perspective view of a second type of key bolt employing the novel locking key of the present invention, with the locking key in the locked position.
Figure 6:
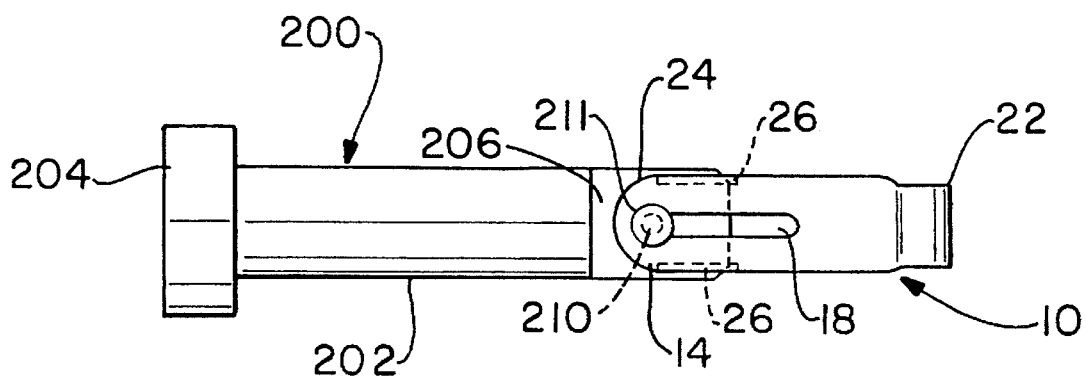
FIG. 6 is a side view of the second type of key bolt employing the novel locking key of the present invention, with the locking key in the unlocked position.

As shown in FIG. 5, a modified type of key bolt 200 may also be used with the novel key 10 of the present invention. In this modification, the key bolt 200 includes a shank 202 having a bolt head 204 at one end thereof. Instead of having an open, transversely disposed bolt slot at its other end, the shank 202 has a key-receiving shelf-type recess 206 formed thereon for slidably receiving a locking key 10 of the present invention. The locking key 10 as described above is slidably disposed atop the shelf-type recess 206 and is shown having its ends 22, 24 extending transversely from the shank 202. A pin 210 is transversely disposed in the shank 202 along shelf-type recess 206, but this pin, unlike pin 110 described above, has a free end 211, which extends substantially perpendicularly outward from the shelf-type recess, and the free end 211 has an enlarged head. The pin 210 passes through the slots 18 in the locking key 10 at substantially right angles thereto to slidably retain the key 10 atop the shelf-type recess 206, between the face of the shelf-type recess and the enlarged head of the free end 211. The gap between the head of the free end 211 of the pin 210 and the face of the shelf-type recess 206 should be smaller than the thickness of the bifurcated end 24 of the key 10, when the bifurcated end is in its normal, non-compressed state. Thus retained, the key 10 is slidable atop the shelf-type recess 206 to an unlocked position wherein the key extends directly outwardly of the shank and forms an extension thereof as shown in FIG. 6. In this position the bolt 200 may be inserted or removed from an aperture having a diameter slightly larger than the shank 202. Note particularly that the rolled end 22 of the key 10 is always positioned outside of bolt shank 202, but that the bifurcated end 24 of the key can be fitted along the face of the shelf-type recess 206 by manually compressing the key at that end and releasing the compressive force once the end 24 is positioned along the shelf-type recess 206. As noted above, when the key 10 is in the locked position as in FIG. 5, the key is substantially perpendicular to the shank 202. As in the other embodiment, the wings 26 formed on the key 10 protrude out of the general plane of the key 10 to form an abutment or key lock 28 abutting the bolt shank 202 adjacent its shelf-type recess 206 to retain the key 10 in locked position.

While both embodiments taught herein use a bolt head 104 or 204, as is known in the prior art, it will be readily apparent that there are many known variations available to the user of the present invention at that end of the key bolt fastener, and the purpose served by the bolt head or the variant is to restrain the key bolt in the aperture. Some examples of the variants are shown in the present inventor's U.S. Pat. No. 3,861,267, where FIG. 1 shows a key bolt of the type described above as bolt 100 having a bolt slot 106; and FIG. 32 shows a key bolt of the type described above as bolt 200 having a shelf-type recess 206. Another variant is shown in the same patent, where FIGS. 30 and 31 show each end of a connecting rod being equipped with the locking key feature. The use of such variants do not affect the efficacy of the present invention at the other end of the key bolt, where the novel locking key of this present invention provides heretofore unknown advantages.

With the above described structures, there is provided a key bolt having a positive locking means that unfailingly retains the bolt in locked position under all operating conditions. No tools are needed to lock, unlock or remove the key bolt. No assembly or disassembly is required such as with cotter keys, jessup clips, etc. The problem of looking on the floor for lost cotter pins and clips is eliminated. A single part wherein the key is always attached to the bolt is all that is to be purchased, stored and inventoried.

While the preferred embodiment and the best mode presently known have been taught, the scope of the present invention is not to be measured by the foregoing specification, but instead is to be determined by the attached claims, which are made a part hereof.

What is claimed is:

1. A key bolt comprising:

a locking key comprising a tweezers-like complex lever having first and second generally planar elongate members, each having a pair of side edges, with one end of each member being joined to one end of the other member to form a first end of the locking key which acts as a resilient fulcrum of the lever, and with the other end of each member extending away from the first end, the other ends forming a bifurcate second end with the members in normally spaced apart relationship, each said member having a slot along the length thereof, one member having its pair of side edges at the bifurcate second end turned outwardly from the plane of the member to form a key lock;

a bolt having a shank with a locking key-receiving adaptation at one end thereof; and wherein the locking key is slidably retained to the key-receiving adaptation by a pin transversely disposed in the shank and passing through said slots at substantially right angles thereto, said locking key being slidable within the adaptation to an unlocked position wherein the first end of the locking key extends directly outwardly of the shank and forms an extension thereof and the locking key being slidable to a locked position wherein the locking key is substantially perpendicular to the shank and the key lock abuts the bolt shank to retain the locking key in locked position, the locking key being yieldable at the bifurcate second end to enable the key lock abutment to be moved from locked position to unlocked position.

2. The key bolt of claim 1 wherein the locking key-receiving adaptation is an open transversely disposed bolt slot wherein the locking key is disposed within said key slot by said pin.

3. The key bolt of claim 1 wherein the locking key-receiving adaptation is shelf-type recess wherein the locking key is disposed atop said shelf-type recess by said pin.

4. The key bolt of claim 1 wherein the locking key is formed from a single elongate blank having first and second ends and a central portion, wherein the central portion is folded over on itself to form the resilient fulcrum of the first end of the locking key and the first and second ends of the blank lie atop each other in normally spaced apart relationship to form the bifurcate second end of the locking key.

5. The key bolt of claim 4 wherein the single elongate blank comprises a strip of spring metal.

6. The key bolt of claim 5 wherein the spring metal is a spring steel.

* * * * *